Figure 3:
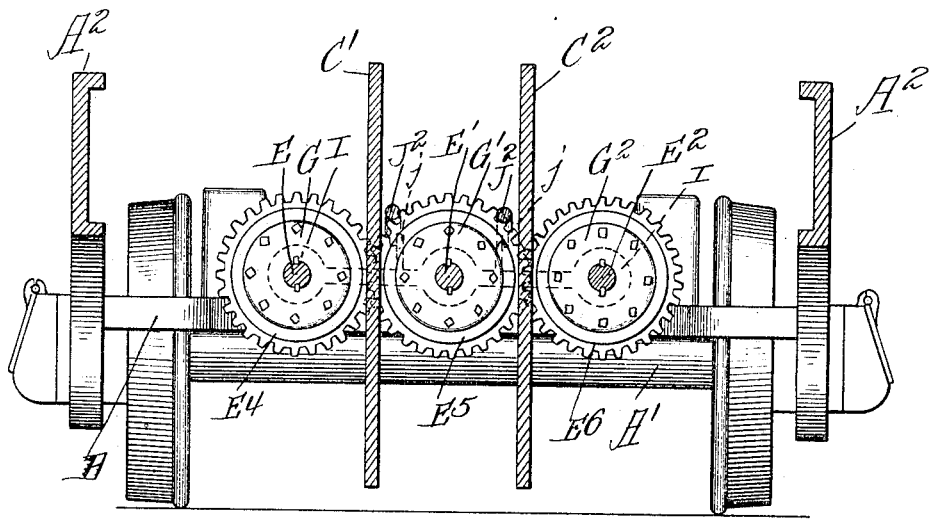

No. 818,898. PATENTED APR. 24, 1906.
G. W. MARBLE.
VARIABLE SPEED MECHANISM.
APPLICATION FILED DEC. 7, 1904.
3 SHEETS—SHEET 2.
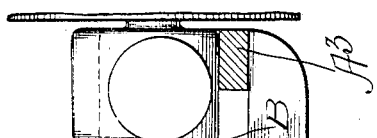

No. 818,898. PATENTED APR. 24, 1906.
G. W. MARBLE.
VARIABLE SPEED MECHANISM.
APPLICATION FILED DEC. 7, 1904.

3 SHEETS—SHEET 3.

Witnesses:
Harry R. Leolute
Ray White.

Inventor
George W. Marble.
By Charles W. Heell, Atty.

UNITED STATES PATENT OFFICE.

GEORGE W. MARBLE, OF CHICAGO, ILLINOIS.

VARIABLE-SPEED MECHANISM.

No. 818,898. Specification of Letters Patent. Patented April 24, 1906.

Application filed December 7, 1904. Serial No. 235,866.

*To all whom it may concern:*

Be it known that I, GEORGE W. MARBLE, a citizen of the United States, and a resident of the city of Chicago, in the county of Cook and State of Illinois, have invented certain new and useful Improvements in Variable-Speed Mechanisms; and I do hereby declare that the following is a full, clear, and exact description of the same, reference being had to the accompanying drawings, and to the letters of reference marked thereon, which form a part of this specification.

This invention relates to improvements in variable-speed mechanisms, and more particularly to a frictional speed mechanism adapted for use with constant-speed or other motors, and is shown embodied in a car-truck, though obviously it may be used with any other vehicle or appliance where variable-speed mechanism is desirable.

Heretofore friction-drives have been devised comprising a driving friction wheel or roller adapted to frictionally engage the face of a disk and to be adjusted radially thereof to vary the speed or diametrically across the center to reverse the driven element. Inasmuch as the pressure of the roller upon the face of the disk is necessarily great when a maximum amount of work is being performed, the disk always, unless made very heavy, springs laterally under the stress, thereby decreasing the frictional engagement between the coacting elements, consequently reducing the effectiveness. Furthermore, it has not been customary in vehicles using four-wheeled trucks, such as street or railway cars, to carry a constant-speed motor upon the truck-frame and to drive by means of variable and reversible speed transmission mechanism.

The object of this invention is to provide a reversible and variable speed mechanism which though driven by a constant-speed or any motor is adapted to drive the vehicle in either direction and to vary the speed within great limits without varying the motor speed.

It is also an object of the invention to so construct the mechanism as to obviate lateral stress on the driven element or elements, while affording double the frictional contact heretofore possible.

It is also an object of the invention to provide a transmission and reverse mechanism adapted to be operated by a single lever and producing a maximum amount of work at a minimum expenditure of energy.

A further object of the invention is to provide a very cheap, simple, and compact device of light weight so constructed as to not readily get out of repair and to be carried, together with the motor, directly upon the vehicle-truck.

The invention consists in the matters hereinafter described, and more fully pointed out and defined in the appended claims.

Figure 4:
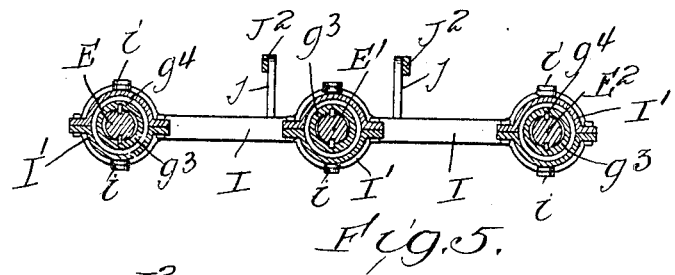
Figure 5:
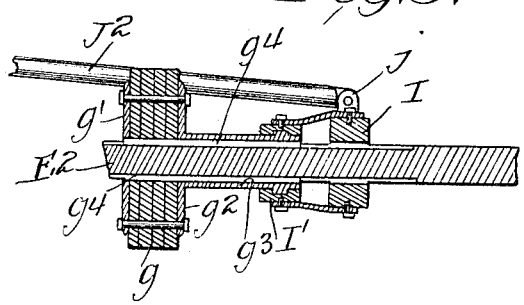

In the drawings, Figure 1 is a fragmentary top plan view of a device embodying my invention. Fig. 2 is a longitudinal section on line 2 2 of Fig. 1 with parts omitted. Fig. 3 is a section on line 3 3 of Fig. 1. Fig. 4 is a section on line 4 4 of Fig. 1 with parts omitted. Fig. 5 is a longitudinal fragmentary section taken through one of the driving friction-rollers and adjusting means therefor.

As shown in said drawings, the construction is embodied as a part of the driving mechanism for a car-truck in which the axles A A' are rotatable and the power of the motor or engine B (conveniently a constant-speed motor of any desired kind) is communicated to one or both axles in propelling the car.

The truck-frame $A^2$ is supported on said axles in the usual or any preferred manner, and a shaft C is journaled at its ends in the side frame members thereof intermediate the front and rear wheels. Rigidly secured on said shaft in any preferred manner intermediate its ends and, as shown, at approximately equal distances from the center thereof are friction-disks C' and $C^2$, which may be of any preferred size or material, but which, as shown, comprise metallic disks having approximately parallel outer and inner faces and provided with elongated hubs $c$ $c$, which enable the disks to be rigidly secured upon said shaft C in unvarying relation with each other.

The wheels on the axle A' at the rear end of the truck are shown smaller than those on the axle A, and the end sill $A^3$ supports the motor B, herein shown as an internal-combustion motor, at a height to permit the motor-shaft B' to extend forwardly over said axle.

Extending across the truck-frame intermediate the axle A' and the shaft C and just below the engine-shaft is a transverse beam or sill D, which, as shown, is rigidly secured at its ends to the side frame members $A^2$ $A^2$. Secured on said sill D, as shown more clearly in Fig. 2, by means, as shown, of bolts $d^2$, are a plurality of pivoted bearing-boxes $d$ rollers G and G' into engagement with the disk C', as before described, and since said friction-rollers rotate said disk oppositely from the disk C² the vehicle will be propelled in the opposite direction.

By means of the lever J' and the connecting-rods J² J² the yoke I can be moved longitudinally of the shafts E, E', and E, respectively, and carries therewith the driving friction-rollers G, G', and G², thus easily moving them radially of the disks C' and C², thereby varying the point of contact between the circumference of said disks and their axis, as is usual in such devices to regulate the speed. The nearer said rollers are to the axis of the disk the higher the speed for a given motor speed.

While I have shown my device as embodied in a car-truck, it is obvious that it may be used upon any motor-driven vehicle and also for many other purposes in which a reversible and variable transmission of great strength is required.

Though I have shown but one embodiment of my invention, I do not purpose limiting the invention in this application otherwise than necessitated by the prior art, as obviously many details of construction and application may be varied without departing from the principles of my invention.

No. 818,899. PATENTED APR. 24, 1906.
W. E. MARTIN.
SIDE DELIVERY RAKE.
APPLICATION FILED OCT. 14, 1905.
2 SHEETS—SHEET 1.
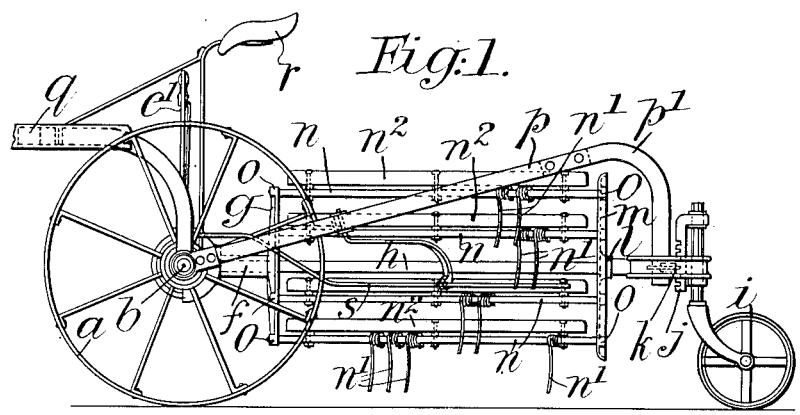
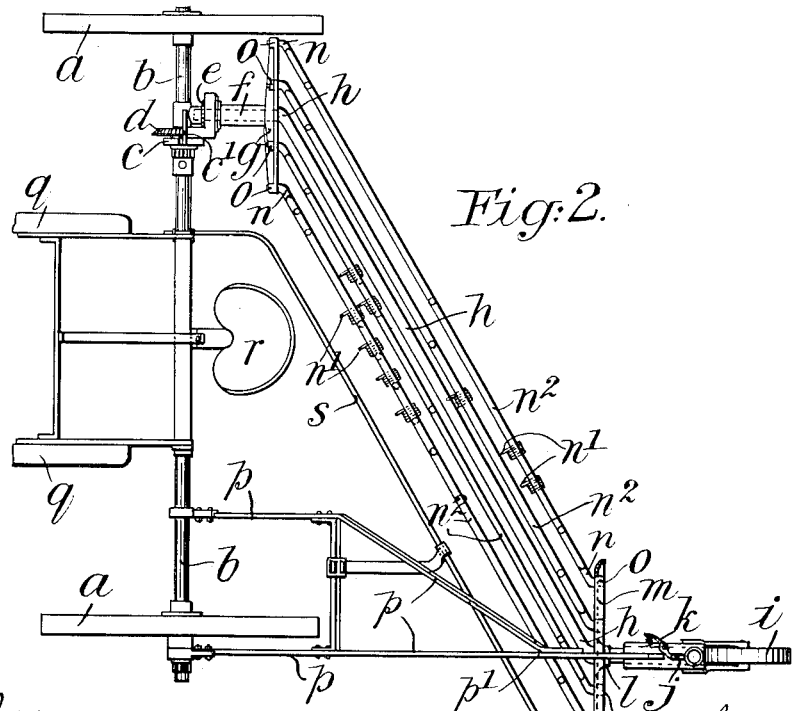

I claim as my invention—

1. The combination with a transmission-shaft, of a friction-disk rigidly secured thereon, a driving-shaft, oppositely-rotating friction-rollers driven thereby and adapted to engage opposite faces of the driven friction-disk, a yoke, non-rotative collars pivotally engaged thereon in which said rollers are journaled and means for shifting said rollers into and out of engagement with the disk.

2. The combination with a transmission-shaft, of a friction-disk carried thereon, a driving-shaft, oppositely-rotative driving friction-rollers actuated thereby and engaging opposite sides the friction-disk, means adapted to shift the driving friction-rollers into and out of engagement with said disk, a non-rotative collar journaled on each roller, a yoke, links affording a pivotal connection between the collars and yoke and a lever acting to shift the rollers radially of the disk.

3. In a device of the class described the combination with a frame, of a rotative transmission member carried thereon, positively-driven rotative means adapted to engage each side of said transmission member, non-rotative collars journaled thereon, a yoke pivotally connected with said collars, an axle journaled in the frame and means for transmitting the motion of said transmission member to said axle.

4. In a device of the class described the combination with an axle and the wheels thereon, of a friction-disk operatively connected with the axle, positively-actuated driving friction-rollers adapted to simultaneously engage each side of said disk to rotate the same and a lever pivotally connected with each and bell-crank levers operatively connecting said levers at their outer ends and acting to vary the engagement of the rollers with said disk.

5. The combination with a driven shaft, of friction-disks thereon, a motor-shaft, oppositely-driven friction-rollers actuated thereby adapted to engage opposite sides of each friction-disk and means for simultaneously shifting the friction-rollers to grip either of said disks intermediate the same thereby reversing the rotation of said disks.

6. In a device of the class described the combination with a transmission-shaft, of a pair of friction-disks rigidly engaged thereon, driving friction-rollers arranged alternately with said disks, means for rotating said driving friction-rollers and means for throwing adjacent pairs thereof into gripping engagement with the disk intermediate the same and transmitting motion thereto.

7. In a device of the class described the combination with the frame of a vehicle, of a pair of driven friction members operatively engaged thereon, driving friction members arranged on each side of each driven friction member, means for throwing either pair of driving members into frictional engagement with the intermediate driven member and a motor-shaft adapted to actuate the driving friction members.

8. The combination with a transmission-shaft and a plurality of driven friction members thereon, of a plurality of oppositely-rotating driving friction members between adjacent ones of which each driven friction member projects, a motor-shaft actuating the driving friction members and toggle-levers acting to grip each driven member between the adjacent driving friction members.

9. The combination with a vehicle-frame and its axle of a shaft journaled therein, a pair of friction-disks rigidly engaged thereon, a plurality of driving-shafts arranged alternately with said disks, a driving friction-roller on each shaft, a shifting mechanism adapted to frictionally engage either disk between an oppositely-rotating pair of driving friction-rollers and means for transmitting the motion of said first-named shaft to said axle.

10. The combination with a vehicle-axle, of a shaft journaled parallel therewith, a pair of friction-disks rigidly engaged on said shaft, pivotally-supported friction-rollers between and adjacent the outer sides of said disks adapted to grip said disks between adjacent ones of the same, means for driving said driving friction-rollers and chain-and-sprocket connection between the shaft and axle.

11. The combination with a vehicle-axle, of a shaft journaled parallel therewith, means for transmitting motion of the shaft to the axle, a pair of friction-disks on said shaft, a driving-shaft projecting between the disks, a shaft parallel therewith and driven thereby on each side thereof, a friction-roller on each of said shafts, means acting to engage either friction-disk between the central friction-roller and one of the adjacent friction-rollers and means adapted to shift said friction-rollers radially of the disks.

12. A variable-speed mechanism comprising in combination, a rotative shaft, a pair of friction-disks rigidly engaged thereon, a plurality of pivotally-supported shafts equally spaced from said disks and one projecting between the same, a motor-shaft operatively connected with said shafts, a driving friction-roller on each of said pivoted shafts, means for throwing the central and either of the laterally-disposed driving friction-rollers into engagement with the friction-disk projecting between the same and means for simultaneously adjusting said driving friction-rollers longitudinally of their shafts.

13. In a device of the class described the combination with a frame, of a rotative shaft thereon, a pair of friction-disks rigidly engaged on said shaft, three rotative shafts pivotally supported on said frame, the central shaft projecting between the disks and one of the others on each side thereof, a driving friction-roller slidably engaged on each shaft, toggle-levers adapted to swing adjacent pivoted shafts laterally and oppositely thereby engaging two adjacent driving friction-rollers with the intermediate disk and releasing the other disk, a yoke operatively engaged with said driving friction-rollers and a lever connected therewith adapted to move the same radially of the disks.

14. In a device of the class described the combination with rotative disks of coacting oppositely-rotative means adapted to simultaneously engage opposite faces of said disks between the same with equal force and lever-operated means for shifting such engagement from one disk to the other.

15. In a device of the class described the combination with a vehicle-frame, of a transverse shaft journaled thereon, a pair of friction-disks rigidly engaged on said shaft, a driving-shaft having a laterally-movable end, projecting between said disks, pivotally-supported driving-shafts parallel therewith and projecting along the outer side of each disk, coacting gears on said central and lateral driving-shafts acting to rotate the outer oppositely from the central shaft, driving friction-rollers slidably engaged on each shaft adapted to simultaneously engage either of said disks, an actuating-lever for each driving-shaft acting to support the end thereof and toggle-levers adapted to be simultaneously actuated and acting to adjust the central driving friction-roller and one of the lateral driving friction-rollers into or out of engagement with one of said friction-disks.

16. In a device of the class described the combination with a frame, of a shaft journaled transversely thereof, friction-disks rigidly engaged on said shaft, pivotally-supported shafts carried on said frame and arranged one between and one on the outer side of each of said disks, a friction-roller slidably engaged on each shaft and adapted to simultaneously engage both sides of one of said disks, means for shifting said rollers radially of said disks comprising an integral sleeve on each roller, a non-rotatable collar on each sleeve, a yoke connected with said collars and a shifting-lever engaged therewith.

In testimony whereof I have hereunto subscribed my name in the presence of two subscribing witnesses.

GEORGE W. MARBLE.

Witnesses:
W. W. WITHENBURY,
H. S. RUDD.